July 23, 1968     A. E. TSCHANZ     3,393,578

ADJUSTABLE REMOTE CONTROL ASSEMBLY

Filed Dec. 28, 1965

INVENTOR.
August E. Tschanz
BY
Barnard, McGlynn & Leising
ATTORNEYS

United States Patent Office 3,393,578
Patented July 23, 1968

3,393,578
ADJUSTABLE REMOTE CONTROL ASSEMBLY
August E. Tschanz, Birmingham, Mich., assignor to Teleflex Incorporated, North Wales, Pa., a corporation of Delaware
Filed Dec. 28, 1965, Ser. No. 516,879
9 Claims. (Cl. 74—501)

ABSTRACT OF THE DISCLOSURE

A motion transmitting remote control assembly of the type including a flexible motion transmitting core element movably supported in a flexible conduit with thread means on one end of the conduit to threadedly engage a nut which is rotatably disposed within an end fitting adapted to be connected to a support structure whereby the thread means telescopes into and out of the end fitting upon rotation of the nut.

---

In the past, where it has been desired to provide an adjustment for such a motion transmitting remote control assembly, it has been generally the practice to cut or sever the conduit intermediate its ends and to provide oppositely threaded members or fittings on the respective severed ends and to connect the fittings through an internally threaded connector nut. This procedure has not proven entirely satisfactory since it requires a cutting operation to sever the conduit and two additional operations to secure the threaded fittings on the respective severed ends of the conduit.

One solution to the problem has been to utilize a remote control assembly including a conduit with a threaded fitting on one end thereof, an end fitting adapted to be connected to a support structure and having a threaded portion at one end thereof, and a connector nut threaded internally at each respective end thereof so as to coact with the threads on the end fitting and the threads on the fitting disposed on the end of the conduit. Although such a motion transmitting remote control assembly has proven very satisfactory in most environments, there are situations where its use is not practical. More specifically, the type of control assembly heretofore utilized, wherein a nut threadedly engages both an end fitting and a fitting secured on the end of the conduit, such a nut must have threads with a lead in one direction at one end thereof and threads with a lead in the opposite direction at the other end thereof. Consequently, the cost of such a nut is significantly greater than the cost of a nut which requires one set of threads with a lead in only one direction. Additionally, when the remote control assembly of the type heretofore utilized is attached to a support structure by attaching the end fitting to the support structure, the space necessary to accommodate such a remote control assembly when fully extended is the distance including the total length of the end fitting, the connector nut, and the threaded fitting disposed on the flexible conduit.

Accordingly, it is an object and feature of the present invention to provide a motion transmitting remote control assembly embodying a simplified length adjusting means which requires less space than heretofore utilized control assemblies.

Another object and feature of the present invention is to provide a motion transmitting remote control assembly including an adjustment means comprising elements which are of a simplified configuration and hence easier and less expensive to fabricate.

Still another object and feature of the present invention is to provide a motion transmitting remote control assembly which requires less space due to the fact that the threaded fitting disposed on the end of the conduit telescopes within the end fitting which is adapted for attachment to a support structure.

Yet another object and feature of the present invention is to provide a motion transmitting remote control assembly of the type including an unsevered length of conduit with a threaded fitting disposed on one end thereof and slidably disposed within an end fitting with an internally threaded nut disposed within the end fitting and coacting with the threaded fitting on the conduit so that upon rotation of the nut, the length of the remote control assembly may be adjusted.

In general, these and other objects and features of this invention are attained by a motion transmitting remote control assembly including a conduit, a threaded fitting disposed on one end of the conduit, and an end fitting having a bore extending therethrough with a nut rotatably supported in a chamber disposed therein. The nut has a threaded hole extending therethrough and the threaded fitting on the conduit is in threaded engagement with the threaded hole in the nut whereby the conduit moves axially relative to the end fitting upon rotation of the nut. A motion transmitting core element is movably disposed in the conduit and in the bore of the end fitting. The nut may, therefore, be manually rotated so as to move the threaded fitting in a telescoping relationship with the end fitting so that the length of the remote control assembly may be adjusted.

Other objects and attendant advantages of this invention will be readily appreciated as the same becomes better understood by reference to the following detailed description when considered in connection with the accompanying drawings wherein.

Figure 1:
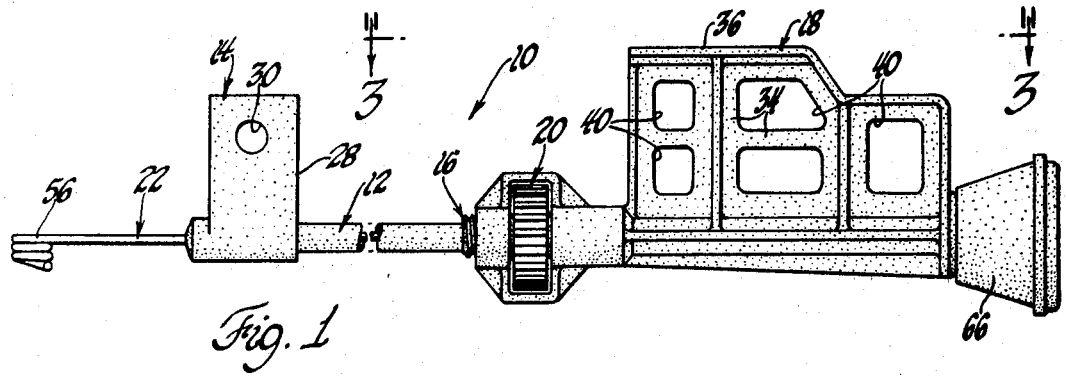
FIGURE 1 is a side elevational view of a motion transmitting remote control assembly constructed in accordance with the instant invention.

Referring now to the drawings, wherein like reference characters indicate like or corresponding parts throughout the several views, a motion transmitting remote control assembly constructed in accordance with the instant invention is generally shown at 10. The remote control assembly includes: a flexible conduit, generally indicated at 12; a support fitting, generally indicated at 14; a thread means or threaded fitting, generally indicated at 16; an end fitting, generally indicated at 18; a wheel or nut, generally indicated at 20; and a flexible motion transmitting core element, generally indicated at 22.

The instant invention preferably utilizes a flexible conduit 12 having an inner surface 24 and an outer surface 26 both of organic polymeric material. More specifically, a conduit, which includes an inner tubular member of organic polymeric material, a plurality of long lay wires wrapped helically on a long lead about the inner tubular member, and a casing of organic polymeric material disposed about the long lay wires, is preferably utilized. The inner surface 24 is preferably of organic polymeric material so that the movement of the core element 22 produces a minimum of friction as a result of the contact between the core element 22 and the inner surface 24 of the conduit 12. The outer surface 26 of the conduit 12 is preferably made of organic polymeric material so that the threaded fitting 16 may be made of an organic polymeric material and molded about the conduit so that the outer surface 26 of the conduit 12 diffuses into the organic polymeric material of the threaded fitting 16, thus securing the threaded fitting 16 to the outer surface 26 of the conduit 12. Likewise, the support fitting 14 is preferably made of organic polymeric material so that it may be molded to the organic polymeric exterior surface 26 of the conduit 12 so that the support fitting 14 is intimately bonded to the outer surface 26 of the conduit 12. The support fitting 14 is adapted for connection to a support structure by the flange 28 which has a hole 30 therein. A screw, bolt, or other type fastener may be inserted through the hole 30 and placed into engagement with a support structure to secure the support fitting 14 to the support structure, hence, securing one end of the conduit 12 to a support structure. The thread means or threaded fitting 16 is provided with the threads 32, the purpose of which will become more clear hereinafter.

The end fitting 18 is also preferably made of organic polymeric material and is substantially inflexible as distinguished from the conduit 12 which is flexible. The end fitting 18 includes the web-like portion 34 extending upwardly to the flange 36. The flange 36 is adapted to be connected to a support structure by the holes 38 through which fasteners may be disposed to engage a support structure. The holes or apertures 40 in the upwardly extending portion 34 of the end fitting 18 are formed when the end fitting 18 is molded so as to effect a savings in the amount of organic polymeric material necessary to make the end fitting 18. Of course, it is to be understood that the end fitting 18 may take one of various shapes and may utilize various means for adapting the end fitting 18 for connection to a support structure.

Figure 2:
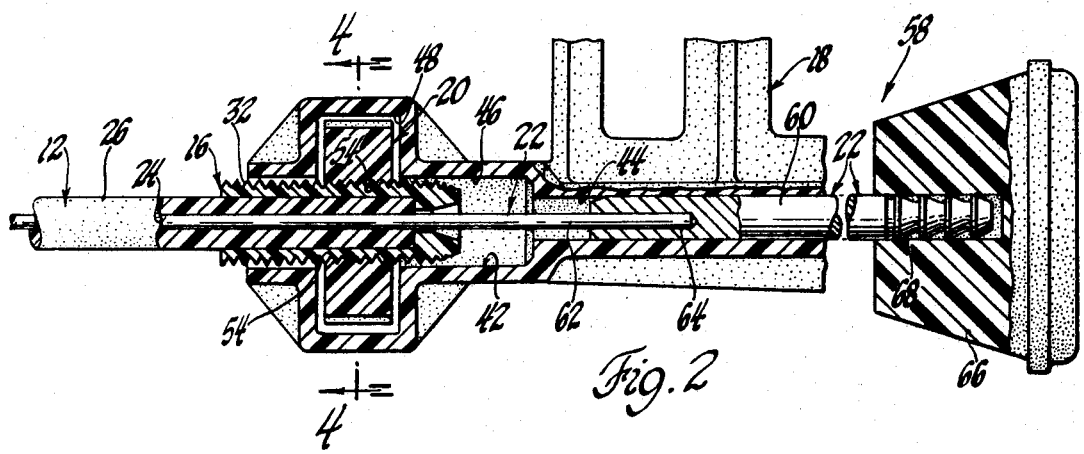
FIGURE 2 is an enlarged, fragmentary cross-sectional view of the remote control assembly shown in FIGURE 1.
Figure 3:
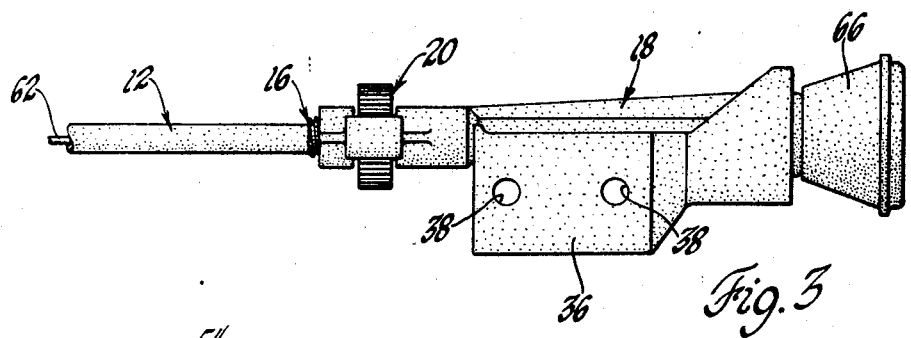
FIGURE 3 is a view taken substantially along line 3—3 of FIGURE 1.
Figure 4:
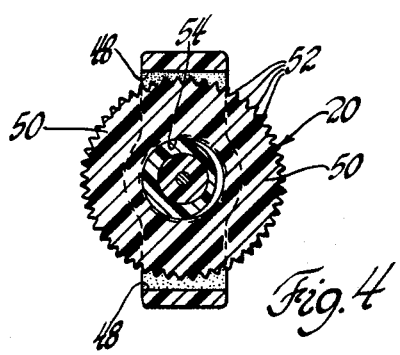
FIGURE 4 is a cross-sectional view taken substantially along line 4—4 of FIGURE 2.

As is more clearly illustrated in FIGURE 2, the end fitting 18 has a bore, generally indicated at 42, which extends therethrough. The bore 42 has a small diameter portion 44 adjacent one end thereof and a large diameter portion 46 adjacent the other end thereof. The threaded fitting 16 is slidably disposed in the large diameter portion 46 of the bore 42.

The end fitting 18 also includes a chamber formed by the passage 48. The passage 48 is disposed transverse to the large diameter portion 46 of the bore 42 and extends completely through the end fitting 18. It is to be understood, however, that the chamber illustrated is formed by a passage 48 extending completely through the end fitting 18, but the chamber may be one of various configurations so long as at least a portion of the chamber extends through the end fitting 18 for providing access thereto from the exterior of the end fitting 18 so that the nut 20 may be grasped manually and rotated from the exterior of the end fitting 18.

The nut 20 is rotatably disposed in the passage 48 so that a portion 50 of the nut extends exteriorly of the end fitting 18 at the respective opposite ends of the passage 48 whereby the nut 20 may be manually rotated from the exterior of the end fitting 18. The nut 20 includes a grooved circumference formed by the grooves 52. A threaded hole 54 extends through the nut 20 and the threads 32 of the threaded fitting 16 are in threaded engagement with the threaded hole 54 so that the threaded fitting 16 slides along the large diameter portion 46 of the bore 42 upon rotation of the nut 20.

The flexible motion transmitting core element 22 is movably disposed in and extends through the conduit 12 and the bore 42 of the end fitting 18. The core element 22 has a first end 56 which extends from one end of the conduit 12 and is adapted for attachment to an element to be controlled. The core element 22 also has a second end extending from the end of the end fitting 18 and includes a means, generally indicated at 58, for manually moving the core element 22. The means 58 includes a bar 60 which is movably disposed in the small diameter portion 44 of the bore 42 and extends exteriorly of the end of the end fitting 18. The bar 60 is attached to the flexible motion transmitter 62 at 64 by swaging, welding, gluing, molding or the like. A knob 66 is disposed on the end of the bar 60 exteriorly of the end fitting 18 for manually actuating the assembly. The knob 66 is secured on the bar 60 by the serrations 68.

The assembly may be installed by respectively securing the support fitting 14 and the end fitting 18 to a support structure and attaching the end 56 of the flexible transmitter 62 of the core element 22 to the element to be controlled such that the distance the bar 60 extends from the end fitting 18 may be varied or adjusted by rotating the nut 20. In other words, when the fittings 14 and 18 are initially connected to a support structure and the first end 56 of the core element 22 is connected to an element to be controlled, the bar 60 of the core element may extend out of the fitting 18 a certain distance yet the element to which the end 56 is connected may be at an extreme or limit of travel so that the bar 60 can be pushed no further into the fitting 18. Thus, in order to retract the bar 60 into the fitting 16, the nut 20 is rotated to move the threaded fitting 16 out of the large diameter portion 46 of the fitting to increase the effective length of the conduit 12 so that the bar 60 slides into the fitting 18. That is, since the distance between the fittings 14 and 18 is fixed as they are attached to a support structure, the conduit 12 bows as the fitting 16 is moved out of the fitting 18 and this increases the length of core element 22 necessary between the fittings 14 and 18 so as to withdraw the bar 60 into the fitting. Of course, it will be understood that the rotation of the nut 20 in the opposite direction will extend the bar 60 to a greater extent from the fitting 18. Upon rotation of the nut 20, the threaded fitting 16 slides in the large diameter portion 46 of the bore 42 so as to telescope into and out of the end fitting 18.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising: a flexible conduit having inner and outer surfaces of organic polymeric material; a support fitting of organic polymeric material connected to a first end of said conduit, said support fitting being adapted for connection to a support structure; a threaded fitting of organic polymeric material on the second end of said conduit; a substantially inflexible end fitting of organic polymeric material and including a flange adapted to be connected to a support structure, said end fitting having a bore extending therethrough, said bore having a small diameter portion adjacent a first end thereof and a large diameter portion adjacent the second end thereof; said threaded fitting slidably disposed in said large diameter portion of said bore; said end fitting including a chamber disposed along said large portion of said bore, said chamber being formed by a passage disposed transverse to said large diameter portion of said bore and extending through said end fitting; a nut rotatably disposed in said passage so that a portion of said nut extends exteriorly of said end fitting at the respective opposite ends of said passage whereby said nut may be manually rotated from the exterior of said end fitting; said nut including a grooved circumference, and a threaded hole extending therethrough; said threaded fitting being in threaded engagement with said threaded hole in said nut whereby said threaded fitting slides along said large diameter portion of said bore in said end fitting upon rotation of said nut; a flexible motion transmitting core element movably disposed in and extending through said conduit and said bore of said end fitting, said core element having a first end extending from said first end of said conduit for attachment to an element to be controlled, said core element having a second end extending from said first end of said end fitting and including means for manually moving said core element, said last-named means including a bar movably disposed in said small diameter portion of said bore of said end fitting and extending exteriorly of said first end of said end fitting, and a knob disposed on the end of said bar exteriorly of said end fitting for manually actuating said assembly, whereby said assembly may be installed by respectively securing said support fitting and said end fitting to a support structure and attaching said core element to the element to be controlled thereby to allow the distance said bar of said core element extends from said end fitting to be varied by rotating said nut.

2. A motion transmitting remote control assembly comprising; a conduit, thread means on a first end of said conduit, an end fitting including means for attachment to a support structure and having a bore extending therethrough, a nut rotatably disposed within said end fitting, said nut having a threaded hole extending therethrough, said thread means disposed in a telescoping relationship with said end fitting and in threaded engagement with said threaded hole in said nut whereby said conduit moves axially relative to said end fitting upon rotation of said nut, and a motion transmitting core element movably disposed in said conduit and in asid bore of said end fitting.

3. A motion transmitting remote control assembly as set forth in claim 2 wherein said end fitting includes a chamber and said nut is rotatably disposed in said chamber and which chamber extends through said end fitting for providing access thereto so that said nut may be rotated from the exterior of said end fitting.

4. A motion transmitting remote control assembly as set forth in claim 3 wherein said chamber is formed by a passage which extends through said end fitting and which transversely intersects said bore in said end fitting.

5. A motion transmitting remote control assembly as set forth in claim 4 wherein said nut is disposed in said passage and extends exteriorly of said end fitting at the respective opposite ends of said passage whereby said nut may be grasped on opposite extremities thereof for rotation thereof.

6. A motion transmitting remote control assembly as set forth in claim 5 wherein said end fitting includes a flange adapted to be connected to a support structure.

7. A motion transmitting remote control assembly as set forth in claim 6 including a support fitting adapted for connection to a support structure and disposed on the second end of said conduit.

8. A motion transmitting remote control assembly as set forth in claim 7 wherein; said bore in said end fitting has a small diameter portion adjacent a first end of said end fitting and a large diameter portion adjacent the second end of said end fitting, said large diameter portion intersects said passage, said thread means is slidably disposed in said large diameter portion of said bore, and said core element is movably disposed in said small diameter portion of said bore and extends from said first end of said end fitting.

9. A motion transmitting remote control assembly as set forth in claim 8 wherein said core element includes, a first end extending from said second end of said conduit for attachment to an element to be controlled, a bar movably disposed in said small diameter portion of said bore and extending from said first end of said end fitting, and a knob secured to said bar exteriorly of said end fitting for manually actuating said assembly.

References Cited

UNITED STATES PATENTS

| | | | |
|---|---|---|---|
| 2,989,877 | 6/1961 | Lavelli | 74—501 |
| 3,289,491 | 12/1966 | Conrad | 74—501 |

FOREIGN PATENTS 589,293  2/1925  France.

FRED C. MATTERN, Jr., *Primary Examiner.*

C. F. GREEN, *Assistant Examiner.*